April 17, 1956  M. W. BURLESON  2,742,384
THERMAL INSULATING EXPANSION JOINT FOR PIPES
Filed Sept. 11, 1952

INVENTOR
MILES W. BURLESON.
BY
ATTORNEY

United States Patent Office 2,742,384
Patented Apr. 17, 1956

2,742,384

THERMAL INSULATING EXPANSION JOINT FOR PIPES

Miles W. Burleson, Westfield, N. J., assignor to Johns-Manville Corporation, New York, N. Y., a corporation of New York Application September 11, 1952, Serial No. 308,967

4 Claims. (Cl. 154—44)

This invention relates to sectional thermal insulating pipe coverings and more particularly to heat-reflective expansion joints between the adjacent ends of adjacent sections of such coverings.

There has been an increasing trend toward the use of single layers in high temperature pipe coverings. Such coverings may comprise a series of tubular or cylindrical sections of insulating material surrounding the pipe and separated from each other by joints occurring longitudinally of the coverings and pipe. The exterior of the sections and the joints are conventionally covered by a jacket of insulating material. With this type of insulation, when high pipe temperatures are encountered, the covering expands only a negligible amount, but the pipe will expand appreciably; for instance, at 1,000° F. the pipe will expand approximately three-tenths of an inch in the length of a standard section of the covering. This expansion causes the covering sections to separate from each other at the longitudinal joints, thereby stretching and tending to weaken or rupture the jacket and also subjecting it to scorching or burning away at the joints. Where the jacket is thus burned away, it has been found that the heat loss from the open joint represents an increase of about ten percent over the total theoretical loss through the insulation. This loss from open joints is probably the greatest weakness of so-called single layer coverings.

It is accordingly desirable, and an object of this invention, to provide a type of joint for coverings of the type described which will materially reduce the heat loss at the joint and overcome the other defects noted above.

More specifically, it is an object of the instant invention to provide a heat-reflective expansion joint, including a reflective band, for longitudinally sectionalized thermal insulating pipe coverings, which will (1) increase the unadhered width of the circumferential strip of the jacket at the joint which is subject to stretching, (2) protect the jacket from excessive temperatures and thus eliminate or reduce scorching, and (3) close the joint and reduce the heat loss.

Figure 1:
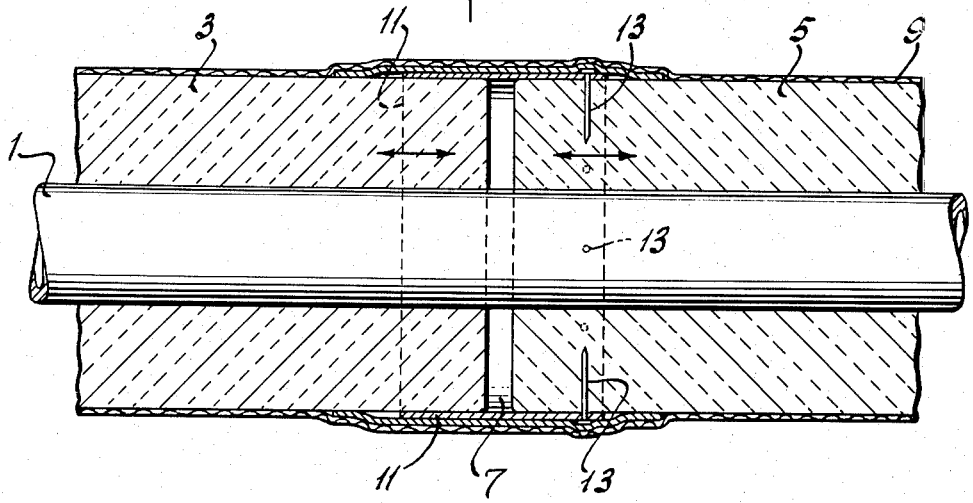
Figure 2:
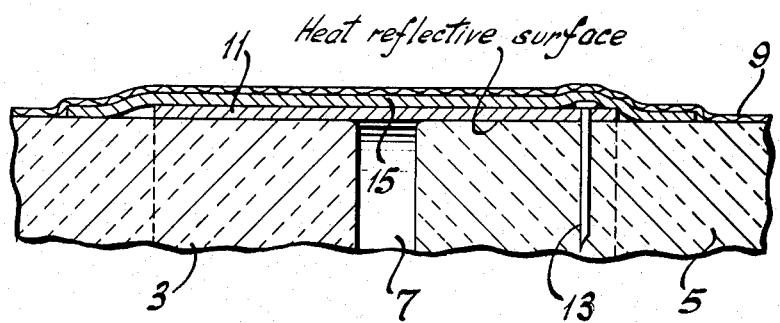

The invention will be more fully understood by reference to the following detailed description in connection with the accompanying drawing, in which:

Fig. 1 is a side view, partly in elevation, and partly in section, showing the adjacent end portions of two sections of insulating covering applied to a pipe, and the joint construction of the instant invention; and Fig. 2 is a partial sectional view of the joint construction, on an enlarged scale.

Referring more specifically to the drawing, reference numeral 1 designates a section of high temperature pipe, such as steam pipe, to which a tubular thermal insulating covering has been applied in longitudinal sections, 3 and 5, which may be of a conventional type and may comprise, for instance, asbestos, magnesia, or a combination of diatomaceous silica and asbestos. Sections 3 and 5 are separated by a joint 7, the width of which depends upon the temperature of the pipe. When the pipe is cold, the joint will close, or nearly so; when the pipe is hot, it expands appreciably, but the covering does not, and the joint opens, as indicated in the drawing, which illustrates the hot pipe condition.

As is conventional practice, a jacket 9 is provided for the covering sections 3 and 5. The jacket, which preferably comprises a heat resisting material such as asbestos, extends over the joint and is preferably secured to the covering sections, as by adhesive, except at the ends of the sections adjacent the joint.

The joint is closed by a heat-reflective band 11 overlying and surrounding the outer peripheries of the adjacent ends of the covering sections and bridging the space therebetween. At least the inner surface of the band is heat-reflective, and a metal band having a bright inner surface is preferred. Band 11 is secured, as by nails or pins 13, to one section only, section 5 as shown, of the adjacent covering sections 3 and 5. The band is slidable on, or with respect to, the other section.

As indicated above, jacket 9 is not secured to the sections 3 and 5 at their ends adjacent the joint. Band 11 is inserted between the jacket and these ends, and the band and jacket are made slidable with respect to each other over the entire width of the band in order to increase the total span of jacket subject to stretching and thus reduce the danger of rupture of the jacket. To facilitate a free sliding of the jacket with respect to the band, means are preferably employed to separate them and prevent the adhesive inner surface of the jacket from sticking to the band. This means may conveniently take the form of a second band 15 of plain or water-proof paper, metal, fabric, or any other suitable material. Band 15 extends over the entire width of band 11 and preferably beyond its axial ends far enough to prevent the adhesive on the inner surface of the jacket from getting into the joint. Band 15 is preferably, but not necessarily, secured to the jacket, as by the adhesive on the jacket.

It will be seen that the construction described in detail above accomplishes the objects of the invention in a simple, inexpensive, and efficient manner. Thus, when the joint opens, in the hot pipe condition, the area of the jacket subject to stretching extends over a considerable axial distance and is sufficient to minimize any mechanical rupturing or weakening of the jacket as a result of the stretching. At the same time band 11 closes the joint to minimize scorching or burning away of the jacket and to reduce heat loss very considerably; for instance, it is estimated that the ten percent heat loss referred to above would be reduced to about two and one-half percent by use of the reflective joint of this invention.

While the invention has been described in rather full detail, it will be understood that these details need not be strictly adhered to but that various changes and modifications may suggest themselves to one skilled in the art, all falling within the scope of the invention as defined by the subjoined claims.

What I claim is:

1. A thermal insulating pipe covering comprising separate complete covering sections of thermal insulating material having a coefficient of thermal expansion differing appreciably from that of the pipe to be insulated, and each completely encompassing the pipe, said complete covering sections having adjacent ends which face longitudinally of the pipe and toward each other in opposed butt joint relationship, said ends having a joint space therebetween which opens and closes as the pipe and said sections expand longitudinally in different amounts in response to thermal variations, means closing said joint space against heat transfer therethrough, said means comprising, a heat reflective band overlying and completely encompassing said adjacent ends and the space therebetween, and a jacket having a coefficient of thermal expansion, differing from that of the pipe to be insulated in a manner generally similar to the coefficient of expansion of the covering sections, said jacket completely encompassing said sections and said band and secured to said sections, said band being anchored to only one of said sections and slidable longitudinally with respect to the other section and to said jacket, thereby to prevent rupture and/or burning out of said jacket as said space opens and closes as aforesaid.

2. A pipe covering as defined in claim 1, and means separating said band and jacket in their relatively slidable relationship and preventing the band from adhering to the jacket.

3. A pipe covering as defined in claim 1, for pipe having a relatively appreciable coefficient of thermal expansion, wherein said sections have a relatively negligible coefficient of thermal expansion, and said band has a highly heat reflective surface directed toward and encompassing said space.

4. A pipe covering as defined in claim 3, in which said highly heat reflective surface is a bright metallic surface on said band, and said jacket is adhesively secured to said sections, and including a second band of material encompassing said heat reflective band and secured to the jacket between the heat reflective band and the jacket to prevent them from adhering to each other, said second band having its inner surface freely slidable on the outer surface of said heat reflective band.

References Cited in the file of this patent

UNITED STATES PATENTS

| | | |
|---|---|---|
| 531,999 | Hunleth | Jan. 1, 1895 |
| 926,423 | Kelly | June 29, 1909 |
| 1,838,242 | Wilson | Dec. 29, 1931 |
| 1,966,341 | Galbraith | July 10, 1934 |
| 2,170,207 | Mosier et al. | Aug. 22, 1939 |
| 2,613,166 | Bronemeyer | Oct. 7, 1952 |